April 17, 1956 — R. A. SANDBERG — 2,741,906
STEERING WHEEL LOCK FOR AUTOMOBILES
Filed July 28, 1953
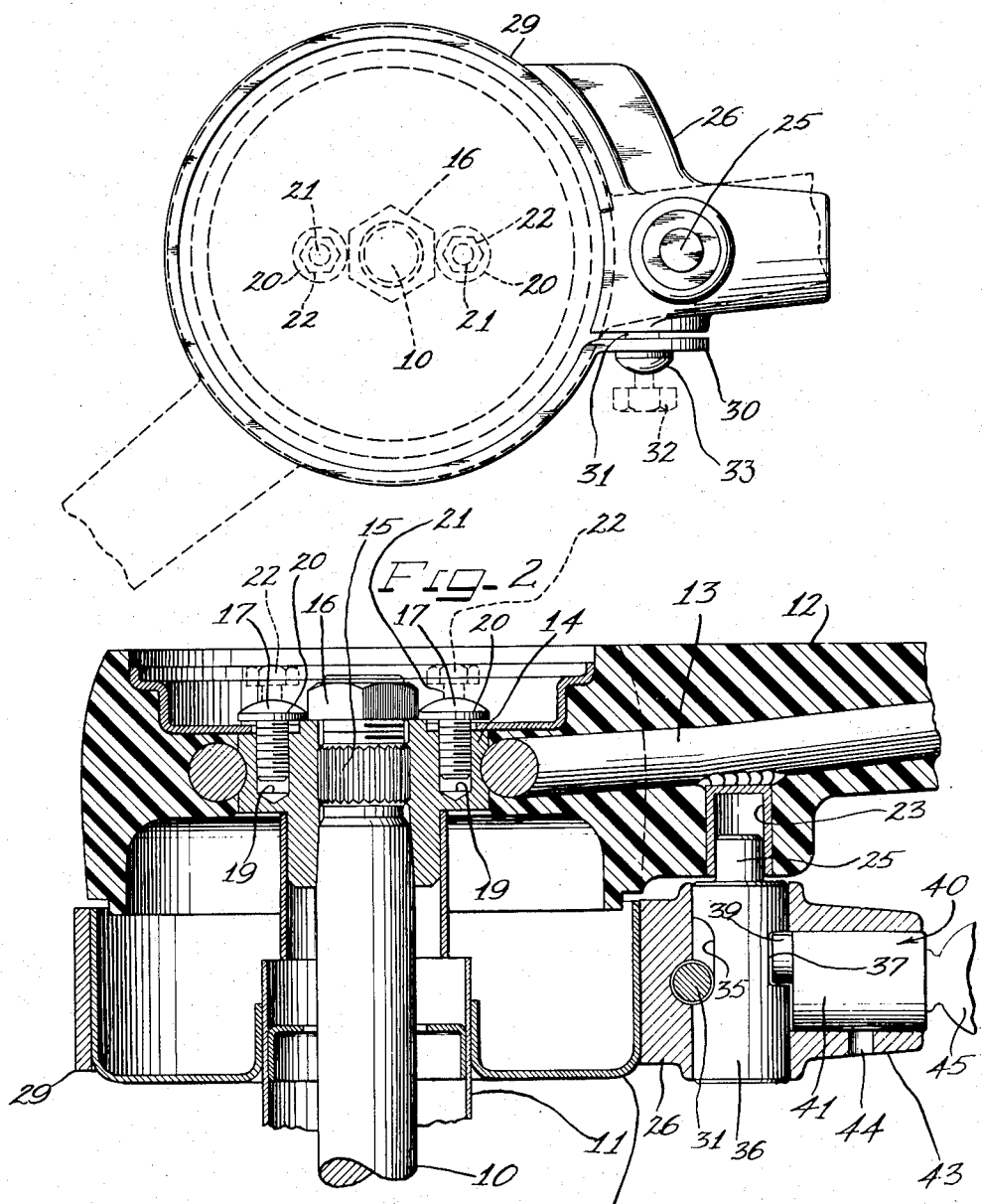
Inventor
RAY A. SANDBERG United States Patent Office 2,741,906
Patented Apr. 17, 1956

2,741,906

STEERING WHEEL LOCK FOR AUTOMOBILES

Ray A. Sandberg, Waukegan, Ill., assignor to Houdaille Industries, Inc., a corporation of Michigan Application July 28, 1953, Serial No. 370,743

3 Claims. (Cl. 70—211)

This invention relates to improvements in steering wheel locks for automotive vehicles and has as its principal objects to provide such a lock, which may be an accessory to the vehicle and may readily be attached to the steering column of the vehicle.

A further object of my invention is to provide a simplified and improved form of accessory lock for the steering wheels of automotive vehicles which may readily be permanently attached to the housing for the steering shaft of the vehicle and having a lock bolt, key operated to move into locking engagement with the steering wheel.

Another object of my invention is to provide a simplified and improved form of lock for automotive vehicles in which the body of the lock is carried by a steel band, and in which the band and body are clamped to the steering column by twist off securing means, twisting off upon clamping of the band to the steering column.

Still another object of my invention is to provide a simplified means for preventing ready removal of the steering wheel from the steering shaft of an automotive vehicle by retaining the nut securing the steering wheel to the shaft from rotation, by a twist off means having threaded engagement with the steering wheel and positioned in juxtaposition to the retaining nut therefor.

Still another object of my invention is to provide a simplified and improved form of steering wheel lock in which a lock body is retained to the housing for the steering shaft by means of a band encircling the housing and clamped to the housing by a twist off screw, threaded within the lock body, and in which the lock bolt is vertically movable into interengagement with the steering wheel by a key operated locking mechanism carried in the lock body and having operative engagement with the lock bolt.

These and other objects of my invention will appear from time to time as the following specification proceeds and with reference to the accompanying drawing wherein:

Figure 1 is a top plan view of a steering wheel lock assembly constructed in accordance with my invention, showing the steering wheel in phantom; and Figure 2 is a transverse sectional view taken thru the lock and steering wheel, showing the lock bolt in interengagement with the steering wheel and showing twist off screws locking the wheel from ready removal from the steering shaft.

In the embodiment of my invention illustrated in the drawing I have shown the upper end portion of a usual steering shaft 10 for steering an automotive vehicle. The shaft 10 is shown as being enclosed by a housing or column 11.

A steering wheel 12 is secured to the upper end of the shaft 10, for turning the same.

The steering wheel 12 may be of any well known form, commonly used to steer automotive vehicles, and as herein shown is formed from a thermoplastic material having a steel insert 13 extending from a central hub 14 along the spokes thereof. The insert 13 also extends around the rim of the wheel as usual. The central hub 14 may be made of steel and the interior thereof may be internally serrated, for engagement with external serrations 15 formed on the upper end portion of the steering shaft 10. The serrations 15 may be the usual involute serrations commonly used to connect steering wheels to steering shafts, to turn the same, and are no part of my present invention so need not herein be shown or described further.

The steering wheel is shown as being held to the shaft 10 as by a nut 16 threaded on the end of the shaft 10 and engaging the top of the hub 14. The central opening through the hub 14 may also be slightly tapered, as may the shaft 10 and serrated portion 15 thereof to accommodate the nut 16 to tightly engage the hub with said shaft.

Turning of the nut 16 is shown as being retarded by two twist off screws, 17, 17 threaded within wheel puller holes 19, 19 in the hub 14. The twist off screws 17 each have a rounded head 20, sufficiently close to the nut 16 to prevent turning thereof. Each twist off screw 17 also has a shank 21 extending outwardly from the head 20, which has a hex head 22, on the end thereof. The hex heads 22, affords a means for tightening the twist off screws 17, and for shearing the shanks 21, thereof when the limit of tightening movement of the screws is reached.

Thus, when the steering wheel is once bolted in position on the shaft 10 and the hex heads of the twist off screws 17, 17 twist from the rounded heads 20, 20 thereof, said twist off screws cannot readily be removed, to remove the steering wheel from the steering wheel shaft, thus, greatly delaying the pulling of the steering wheel from its shaft in cases where the steering wheel is locked from turning movement.

The steering wheel 12 is shown as having a downwardly opening cup 23 forming a keeper for the lock and recessed within a spoke thereof. The cup 23 may be made of metal, such as steel and may be welded or otherwise secured to the steel insert 13. The cup 23 is shown as opening to the bottom of the steering wheel 12 for engagement by a lock bolt 25, slidably carried in a lock body 26.

The lock body 26 is shown as having an inner peripheral portion conforming generally to the periphery of a steering wheel housing 27, secured to the steering shaft housing 11 and extending outwardly therefrom and forming a housing for the sliding contacts and the wiring for operating the horn.

The lock body 26 is shown as having a lock band 29 secured thereto as by machine screws (not shown), or by any other suitable securing means and conforming to the periphery of the steering wheel housing 27 and extending along the periphery of said housing. The lock band 29 is shown as having an outwardly turned free end portion 30, extending closely adjacent to and generally parallel to the end of the lock body, and affording a means for clamping the lock band to the housing 29, as by a twist off screw 31.

As herein shown, the twist off screw 31 has a hex head 32 with a reduced diameter shank twisting from a rounded head 33 of the screw, and is threaded within the lock body 26 and also extends through a slot 35 formed in and extending along an enlarged diameter body 36 of the lock bolt 25, for retaining the bolt to the lock body.

The body 36 of the lock bolt 25 is shown as being slidably mounted in the lock body and as having the reduced diameter bolt 25 extending from the top thereof, for engagement within the cup or keeper 23. The body 36 of the lock bolt also has a recess or slot 37 in the opposite side thereof from the slot 35 and adapted to be engaged by an eccentric pin 39 of a key operated locking mechanism 40. The key operated locking mechanism may be of any well known form and may include a barrel 41 mounted within a lug 43 extending outwardly from the lock body 26 and having the key operated locking mechanism (not shown) rotatably carried therein. The barrel 41 may be locked in position within the lock body by means of a hardened pin 44, which may be threaded within the lock body into engagement with the barrel 41 and broken off flush with the outer surface of the lock body, to prevent removal of the lock barrel 41, except by drilling out the hardened pin 44. A key 45 is shown as being provided to operate the key operating lock mechanism and turn the eccentric 39 within the barrel 41, to move the bolt 25 upwardly into engagement with the downwardly opening cup 23 and to hold the bolt 25 into position to lock the steering wheel from turning movement, and to disengage said bolt from said cup and accommodate the wheel to be turned, for steering the vehicle.

It may be seen from the foregoing that a simple and improved form of steering wheel lock has been provided in which the lock may be clamped to the steering wheel housing by a twist off screw means and in which the steering wheel may also be locked in position on the steering shaft by a similar twist off screw means, to so mount the steering wheel to the shaft and the lock body to the steering wheel housing, as to prevent ready removal thereof, and to thus increase the difficulty in disengaging the lock bolt from the steering wheel except by special time consuming operations.

It will be understood that various modifications and variations of the present invention may be effected without departing from the spirit and scope of the novel concepts thereof.

I claim as my invention:

1. In a lock assembly for automotive steering wheels for locking the wheel from steering movement, a lock body having a lock bolt slidably mounted therein for extensible and retractible movement with respect thereto, an eccentric pin extending perpendicularly to said bolt and having slidable engagement therewith, for extending and retracting the same upon orbital movement of said pin, key operated mechanism orbitally moving said pin and holding said pin in position to hold said lock bolt in locking engagement with the steering wheel, and means preventing turning movement of said lock body with the steering wheel and retaining said bolt to said body comprising a strap secured to said body and forming a continuation of the inner face thereof and having an outwardly projecting end portion extending generally parallel to an end face of said body, and a twist off screw having a round head engaging said strap, said screw extending through said strap and being threaded within said lock body to clamp said strap to the housing for the steering shaft, and twisting off when said strap is clamped to the steering housing with sufficient pressure to maintain said strap and lock body from rotation with the steering wheel, and said twist off screw also having slidable interengagement with said lock bolt.

2. A lock assembly for locking the steering wheels of automotive vehicles from steering movement comprising a lock body having a lock bolt slidably mounted therein and vertically extensible therefrom for interengagement with a steering wheel, key operated mechanism including an eccentric pin extending perpendicularly to the axis of said lock bolt and having slidable engagement therewith for extending said lock bolt from said body and holding the same in extended relation with respect thereto, a lock strap adapted to extent around a steering housing and forming a continuation of the inner margin of said lock body and secured thereto at one of its ends and having a free end projecting outwardly along an end face of said lock body, and means for holding said lock bolt within said lock body and limiting extensible and retractible movement thereof and clamping said lock strap to the steering shaft housing comprising a twist off screw extending through said strap and threaded within said lock body and intersecting the peripheral margins of said lock bolt, said lock bolt having a recessed portion extending therealong for a portion of the length thereof, and forming a recess to accommodate said twist off screw to pass therethrough.

3. In a lock assembly for automotive steering wheels for locking the wheel from steering movement, a lock body having a lock bolt slidably mounted therein and vertically extensible therefrom for interengagement with a steering wheel, key operated mechanism for extending said lock bolt from said body and holding the same in extended relation with respect thereto, a lock strap adapted to extend around a steering housing and forming a continuation of the inner margin of said lock body and secured thereto at one of its ends and having a free end projecting outwardly along an end face of said lock body, and means for holding said lock bolt within said lock body and limiting extensible or retractible movement thereof and clamping said lock strap to the steering shaft housing comprising a twist off screw extending through said strap and threaded within said lock body and intersecting the peripheral margins of said lock bolt, and having slidable interengagement with said lock bolt.

References Cited in the file of this patent

UNITED STATES PATENTS

| | | |
|---|---|---|
| 134,990 | Hood | Jan. 21, 1873 |
| 1,393,552 | Leonard | Oct. 11, 1921 |
| 1,430,239 | Lampman | Sept. 26, 1922 |
| 1,453,531 | Smith | May 1, 1923 |
| 1,496,788 | Siegel | June 10, 1924 |
| 1,628,712 | Curtis | May 17, 1927 |